(12) United States Patent
McLean et al.

(10) Patent No.: US 11,049,119 B2
(45) Date of Patent: Jun. 29, 2021

(54) APPARATUS AND METHOD FOR DISPENSING A PRODUCT IN RESPONSE TO DETECTION OF A SELECTED FACIAL EXPRESSION

(71) Applicant: Wild Blue Technologies, Inc., De Pere, WI (US)

(72) Inventors: Steven E. McLean, Green Bay, WI (US); Skyler S. Lauren, De Pere, WI (US); Michael J. Hill, Portland, OR (US); Justin D. Kovac, Seattle, WA (US)

(73) Assignee: Wild Blue Technologies. Inc., De Pere, WI (US)

( * ) Notice: Subject to any disclaimer, the term of this patent is extended or adjusted under 35 U.S.C. 154(b) by 1046 days.

(21) Appl. No.: 15/154,961

(22) Filed: May 14, 2016

(65) Prior Publication Data

US 2016/0371707 A1    Dec. 22, 2016

Related U.S. Application Data

(60) Provisional application No. 62/182,262, filed on Jun. 19, 2015.

(51) Int. Cl.
*G06Q 30/02* (2012.01)
*G06K 9/00* (2006.01)

(52) U.S. Cl.
CPC ..... *G06Q 30/0201* (2013.01); *G06K 9/00302* (2013.01)

(58) Field of Classification Search
CPC .................. G06Q 30/0201; G06K 9/00302

USPC ......................................................... 705/7.29
See application file for complete search history.

(56) References Cited

U.S. PATENT DOCUMENTS

| 5,882,192 | A | 3/1999 | Bergersen | |
|---|---|---|---|---|
| 7,756,604 | B1 * | 7/2010 | Davis | G06Q 20/342 700/240 |
| 7,885,726 | B2 * | 2/2011 | Walker | G06Q 20/20 700/240 |
| 9,916,612 | B2 * | 3/2018 | Morris | G06Q 30/0631 |
| 2005/0197923 | A1 * | 9/2005 | Kilner | G06Q 30/0201 382/118 |
| 2006/0206371 | A1 | 9/2006 | Hill | |
| 2007/0239519 | A1 * | 10/2007 | Walker | G06Q 10/06375 705/7.29 |
| 2008/0037841 | A1 | 2/2008 | Ogawa | |
| 2014/0156398 | A1 * | 6/2014 | Li | G06K 9/00288 705/14.53 |

(Continued)

OTHER PUBLICATIONS

Toshio Yokouchil, Today and Tomorrow of Vending Machines and its Services in Japan, Jun. 30, 2010, 2010 7th International Conference on Service Systems and Service Management, IEEE (Year: 2010).*

*Primary Examiner* — Patricia H Munson
*Assistant Examiner* — Chesiree A Walton
(74) *Attorney, Agent, or Firm* — Reinhart Boerner Van Deuren P.C.

(57) ABSTRACT

An apparatus and method for dispensing a product or sample in response to the detection of a selected facial expression such as a smile. A computerized device having a camera and utilizing facial recognition and facial expression determining software is connected to a mechanical dispensing unit to dispense one product sample to a customer during a predetermined period of time such as one day.

20 Claims, 8 Drawing Sheets

(56) References Cited

U.S. PATENT DOCUMENTS

2015/0348162 A1* 12/2015 Morris .................. A61B 5/165
　　　　　　　　　　　　　　　　　　　　　　705/26.7
2016/0063314 A1* 3/2016 Samet ................ G06K 9/00268
　　　　　　　　　　　　　　　　　　　　　　348/78
2016/0275518 A1* 9/2016 Bowles .................... G07F 7/06

* cited by examiner

APPARATUS AND METHOD FOR DISPENSING A PRODUCT IN RESPONSE TO DETECTION OF A SELECTED FACIAL EXPRESSION

IDENTIFICATION OF RELATED PATENT APPLICATION

This patent application claims priority of U.S. Provisional Patent Application No. 62/182,262, filed on Jun. 19, 2015, which is entitled "Apparatus and Method for Dispensing a Sample in Response to Detection of a Selected Facial Expression," which patent application is hereby incorporated herein by reference in its entirety.

BACKGROUND OF THE INVENTION

Field of the Invention

The present invention relates generally to the marketing of a product to consumers, and more particularly to an apparatus and method for dispensing a product or sample in response to the detection of a selected facial expression such as a smile.

When it comes to candy and like confections, the typical store or shopping center confection experience generally isn't very inspiring. Studies have shown that only about twenty-five percent of all shoppers venture down the confection aisle, and of that fraction, only one in three can be counted on to purchase a candy product. Thus, only about eight percent of all shoppers buy candy in any given shopping trip. Generally, buying candy is usually an impulse action, since candy is rarely included on a shopping list. Thus, grabbing the attention of busy shoppers is both a must and a challenge in driving the purchase of candy, since shopper distraction is high and schedules are tight.

Companies and stores use free product or sample giveaways because they build shopper enthusiasm for the product being sampled. Most shoppers enjoy receiving free products as samples, and many shoppers who would otherwise not buy the product if it wasn't part of a sample product giveaway will actually choose to buy the product if they enjoy the sample. This is particularly true for candy, and also for other snack and food products, with companies often paying stores just for the right to give away products as samples on the store's premises. This helps to build customer loyalty, and marketing publications have discussed the psychology of providing free product samples in generally positive terms.

However, providing free product samples using a company-paid employee to provide the sample products can be an expensive way to do so. In addition, the number of companies using such a strategy has widened dramatically, particularly in club stores where on weekends there are often a seemingly endless number of product samples being given away, all in the same manner. Since one of the principles of marketing is to do so in a way to set the product being marketed apart from all other similar products, it will thus be appreciated that it would be desirable to provide a different way of providing product samples to customers.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The present invention provides a new, useful, and advantageous apparatus and method to dispense a product sample in response to the detection of a selected facial expression such as, for example, a smile.

In an apparatus embodiment, an apparatus for dispensing a product or sample in response to the detection of a selected facial expression includes: a camera for capturing an image of a customer's face located in front of the camera; a display unit for displaying the image of the customer's face captured by the camera, the display unit also displaying information to prompt the customer in the use of the apparatus; a user input device for allowing the customer to manually respond to information prompting the customer; a facial characteristic analysis element for analyzing images of customers' faces; a facial memory storage element for storing facial characteristics of customers who have had their image captured over a prior predetermined period of time; a facial analysis element for detecting a selected facial expression in the image of the customer's face captured by the camera; an identification element for determining whether the customer's facial characteristics are the same as the facial characteristics of one of the customers who have had their image captured over the prior predetermined period of time; a dispensing unit to dispense a product or sample upon receipt of a product dispending signal; and a processing unit for generating a product dispending signal only if: 1. the identification element determines that the customer's facial characteristics are different from the facial characteristics of all of the customers who have had their image captured over the prior predetermined period of time; and 2. if the facial analysis unit detects the selected facial expression in the image of the customer's face captured by the camera.

In a method embodiment, a method for dispensing a product or sample in response to the detection of a selected facial expression includes: capturing an image of a customer's face located in front of a camera; displaying the image of the customer's face captured by the camera on a display unit, the display unit also displaying information to prompt the customer in the use of the apparatus; allowing the customer to manually respond on a user input device to information prompting the customer; analyzing images of customers' faces with a facial characteristic analysis element; storing facial characteristics of customers who have had their image captured over a prior predetermined period of time in a facial memory storage element; detecting a selected facial expression in the image of the customer's face captured by the camera with a facial analysis element; determining whether the customer's facial characteristics are the same as the facial characteristics of one of the customers who have had their image captured over the prior predetermined period of time with an identification element; generating a product dispending signal only if: 1. the identification element determines that the customer's facial characteristics are different from the facial characteristics of all of the customers who have had their image captured over the prior predetermined period of time; and 2. if the facial analysis unit detects the selected facial expression in the image of the customer's face captured by the camera; and dispensing a product or sample from a dispensing unit upon receipt of a product dispending signal.

In another apparatus embodiment, an apparatus for dispensing a product in response to the detection of a selected facial expression includes: a camera for capturing an image of a customer's face; a display unit for displaying the image of the customer's face captured by the camera; a facial memory storage element for storing parameters of a desired facial characteristic; a facial memory storage element for storing facial characteristics of customers who have previously had their image captured; a facial analysis element for determining whether an image of a customer's face contains the desired facial characteristic; an identification element for determining whether the customer's facial characteristics are the same as the facial characteristics of one of the customers who have had their image captured over the prior predetermined period of time; a dispensing unit to dispense a product upon receipt of a product dispending signal; and a processing unit for generating a product dispending signal only if: 1. the identification element determines that the customer's facial characteristics are different from the facial characteristics of all of the customers who have had their image captured previously; and 2. the identification element determines that the image of a customer's face contains the desired facial characteristic.

The apparatus and method for dispensing a sample product in response to the detection of a selected facial expression of the present invention provides an apparatus and a method to dispense a product sample in response to the detection of a selected facial expression such as a smile. The apparatus and method for dispensing a sample product in response to the detection of a selected facial expression of the present invention may be configured to dispense one product sample to a customer during a predetermined period of time (such as one day). Finally, the apparatus and method for dispensing a sample product in response to the detection of a selected facial expression of the present invention achieves numerous advantages without incurring any substantial relative disadvantage.

DESCRIPTION OF THE DRAWINGS

These and other advantages of the present invention are best understood with reference to the drawings, in which.

DETAILED DESCRIPTION OF AN EXEMPLARY EMBODIMENT

Figure 1:
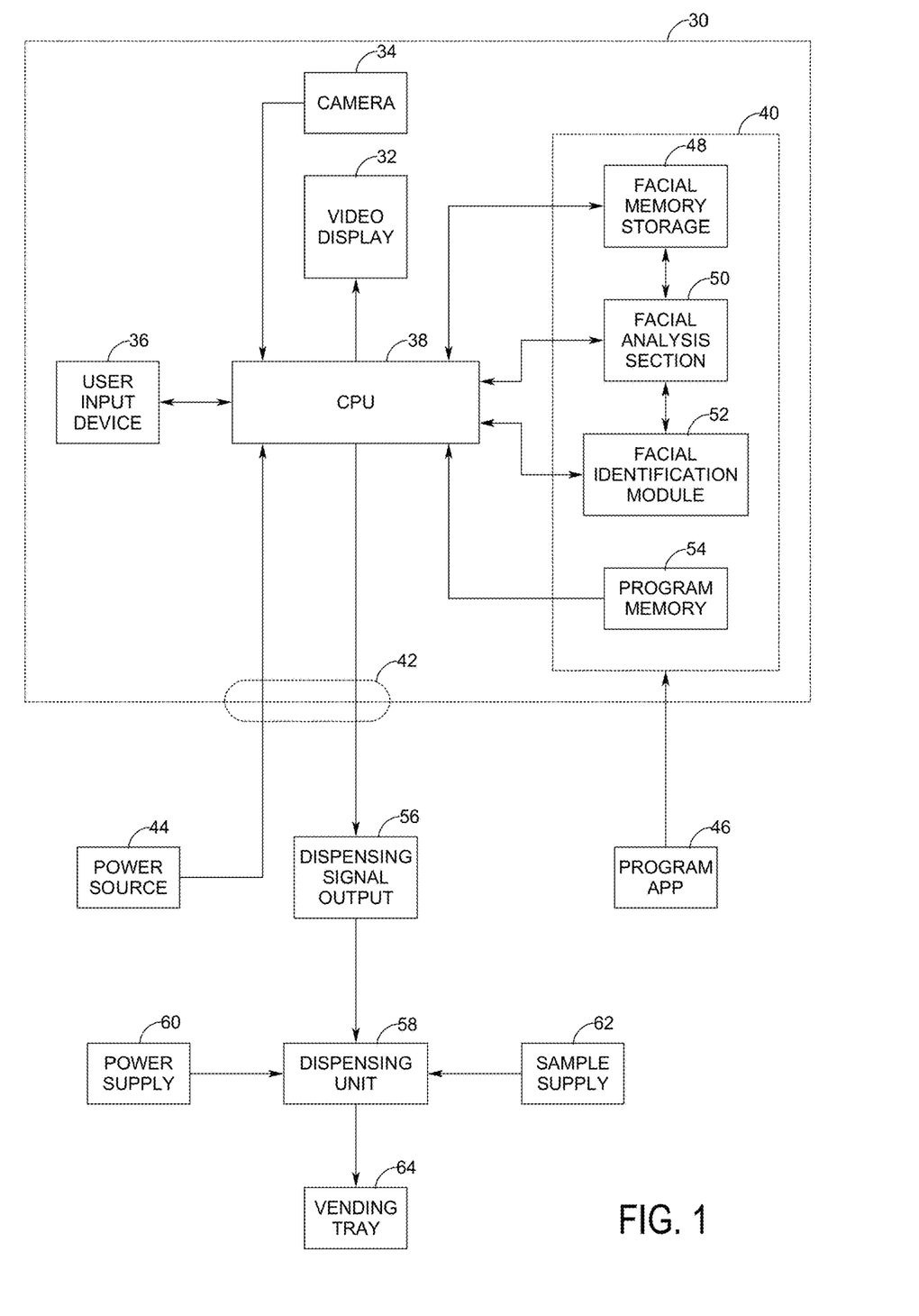
FIG. 1 is a somewhat schematic depiction of an apparatus for dispensing a product sample in response to the detection of a selected facial expression.

A functional schematic of an exemplary embodiment of the apparatus and method for dispensing a product sample in response to the detection of a selected facial expression is shown in FIG. 1. In this embodiment, a tablet computer 30 is used to provide a video display 32, a digital camera 34, and a user input device 36. In the exemplary embodiment the user input device 36 may be a touchscreen also incorporating the video display 32, and the tablet computer 30 may be, for example, an Apple Corporation iPad tablet (Apple and iPad are registered trademarks of Apple Computer). It will be appreciated by those skilled in the art that any other computer with similar components could also be used instead of the tablet computer 30.

The tablet computer 30 also includes a memory storage 40 which includes both hardware and software stored in the various hardware components of the memory storage 40. The tablet computer 30 has an input/output connector 42 through which the tablet computer 30 is proved with power from a power source 44. The tablet computer 30 may be provided with application software or "apps" such as a program app 46 which will be used to implement the method for dispensing a product sample in response to the detection of a selected facial expression of the present invention.

The memory storage 40 of the tablet computer 30 includes a facial memory storage 48 which will be used to store facial recognition data of individuals who have accessed the apparatus for dispensing a product sample in response to the detection of a selected facial expression, preferably within a preselected time period (e.g., the last 24 hours, or a shorter period if desired). The memory storage 40 also includes a facial analysis section 50 which compares the characteristics of a face provided by the camera 34 with facial recognition data stored in the facial memory storage 48.

Based upon the information provided by the facial analysis section 50, a facial identification module 52 will either identify the face provided by the camera 34 with a face identified by the facial recognition data stored in the facial memory storage 48 or alternately indicate that it is a new face not identified by the facial recognition data stored in the facial memory storage 48. The operation of the method for dispensing a product sample in response to the detection of a selected facial expression is controlled by information from the program app 46 which is stored in the program memory 54 in a memory storage 40.

The tablet computer 30 also provides a dispensing signal output 56 to operate a dispensing unit 58, which will dispense a product sample upon receiving the dispensing signal output 56 from the tablet computer 30. The dispensing unit 58 is provided with power from a power supply 60, and with product samples from a sample supply 62. The product samples are dispensed by the dispensing unit 58 into a vending tray 64.

Figure 2:
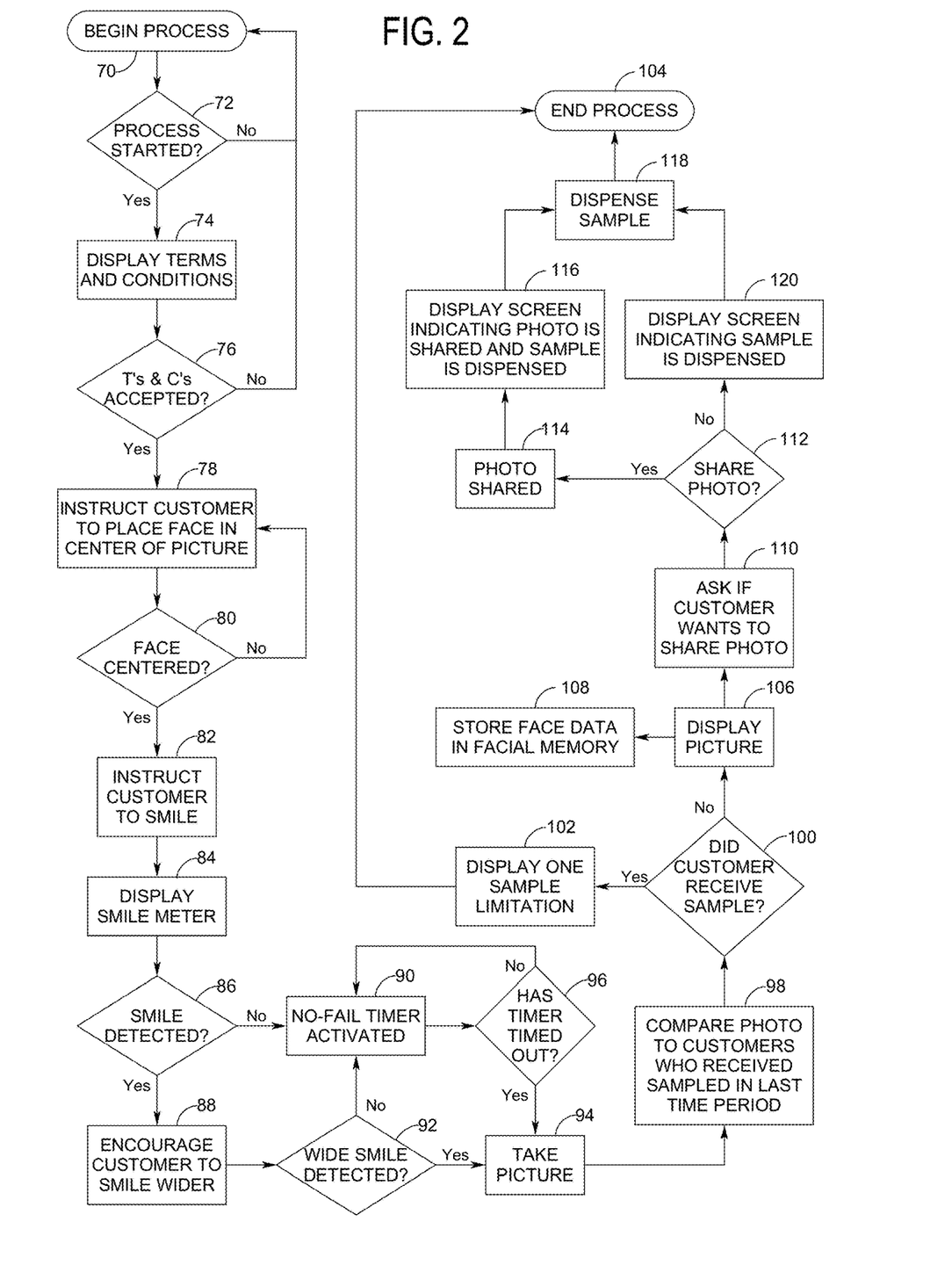
FIG. 2 is a flowchart illustrating an embodiment of a method for dispensing a product sample in response to the detection of a selected facial expression.

Referring next to FIG. 2, an exemplary method for dispensing a product sample in response to the detection of a selected facial expression is illustrated. The process begins with a process initiation step 70, and continues to a process started determination step 72 in which it is determined whether or not a customer has initiated the method. If a customer has not initiated the method, the process remains at the process initiation step 70. If, on the other hand, a customer has initiated the method, the process moves to a display terms and conditions step 74.

In the display terms and conditions step 74, the terms and conditions of the sampling program are explained, and the customer is asked to accept them (using the user input device 36 shown in FIG. 1). If the customer accepts them as determined in a terms and conditions acceptance determination step 76, the process moves to a center face in picture step 78. If the customer does not accept the terms and conditions, the process ends and moves back to the process initiation step 70.

In the center face in picture step 78, the customer is instructed to place his or her face in the center of the picture (on the video display 32 shown in FIG. 1). Next, in a face centered determination step 80, it is determined whether or not the customer has placed his or her face in the center of the picture. If the customer has placed his or her face in the center of the picture, the process then moves to an instruct customer to smile step 82. If, on the other hand, the customer has not placed his or her face in the center of the picture, the process moves back to the center face in picture step 78.

In the instruct customer to smile step 82, the customer is instructed to smile. Next, in a display smile meter step 84, a meter which displays the extent to which the customer is smiling, from a small smile to a large smile (using the facial analysis section 50 shown in FIG. 1). The process then moves to a smile detection determination step 86 in which it is determined whether or not the customer is smiling. If the customer is smiling, the process then moves to an encourage wider smile step 88. If, on the other hand, the customer is not smiling, the process moves to a no-fail timer activation step 90.

In the encourage wider smile step 88, the customer is encouraged to smile more broadly (using the smile meter which is preferably still displayed). From the encourage wider smile step 88, the process next moves to a wide smile detection determination step 92 in which it is again determined whether or not the customer is smiling. If the customer is smiling, the process then moves to a take picture step 94. If, on the other hand, the customer is not smiling, the process moves to the no-fail timer activation step 90.

In the no-fail timer activation step 90, a timer is started that times a predetermined period (e.g., ten seconds) after which the process will move to the take picture step 94 whether or not the customer is smiling. This step is used to prevent customers from being discouraged and/or confused and not receiving a product sample, resulting in an unhappy customer.

After the customer's picture is taken in the take picture step 94, the process moves to a facial recognition step 98 (performed by the facial analysis section 50 and the facial identification module 52 shown in FIG. 1) in which the facial characteristics of the customer's photo is compared with facial characteristic data of customers' photos taken in the prior preselected time period to determine whether or not the customer has already received a product sample in that time period. This is to prevent a customer from receiving more than one product sample in that time period (e.g., more than one product sample each day). After the preselected time period, customers' photos and facial characteristic data are erased to minimize or eliminate privacy concerns. Note that if a store having the apparatus and method for dispensing a product sample in response to the detection of a selected facial expression is only open for eight hours in a day, the predetermined time period can be shortened to eight hours.

The process then moves to a return customer determination step 100, in which it is determined whether or not the customer has previously received a product sample in the predetermined time period. If it is determined that the customer has previously received a product sample in the predetermined time period, the process moves to a return customer condolence step 102 in which the customer is informed that he or she is only able to receive one product sample, with the process then terminating in a process termination step 104. Optionally, in the return customer condolence step 102 the customer's picture may be displayed. If, on the other hand, it is determined that the customer has not previously received a product sample in the predetermined time period, the process moves to a display picture step 106.

After the display picture step 106, the customer's facial characteristic data is stored (in the facial memory storage 48 shown in FIG. 1) in a store facial data step 108. The process next moves to a photo sharing query step 110 in which the customer is asked if he or she is willing to share the photo on social media, which may include the website of the company who markets the product being sampled, and potentially on the apparatus for dispensing the product sample. The process moves to a photo sharing determination step 112, where if the customer agrees to share his or her photo the photo is shared in a photo sharing step 114 (it will be understood by those skilled in the art that this would be implemented using a modem contained in the tablet computer 30 which would be connected to the Internet).

If the photo is shared, the process then moves to a confirm photo sharing step 116, in which the customer's photo is shown together with an indication that the photo is shared and that the product sample is being dispensed. The product sample is then dispensed in a dispense sample step 118, after which the process terminates in the process termination step 104. If, on the other hand, the customer does not agree to share his or her photo in the photo sharing determination step 112, the process moves instead to a display sample dispensed step 120 in which the customer's photo is shown together with an indication that the product sample is being dispensed. The product sample is then dispensed in the dispense sample step 118, after which the process terminates in the process termination step 104.

Figure 3:
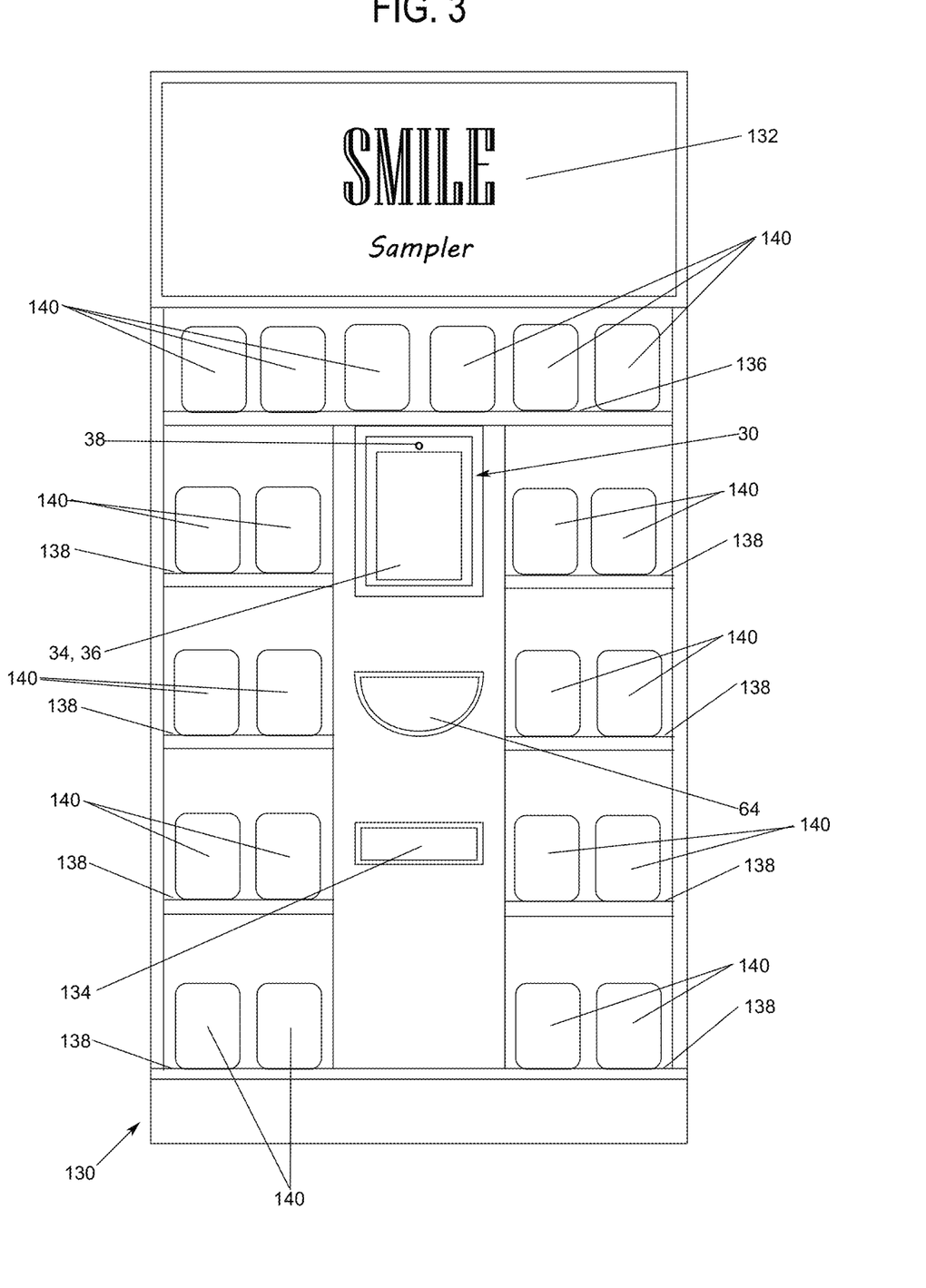
FIG. 3 is a front plan view of an embodiment of an apparatus for dispensing a product sample in response to the detection of a selected facial expression.

Referring now to FIG. 3, a sample dispensing device 130 for dispensing a product sample in response to the detection of a selected facial expression is shown. It may be seen that the tablet computer 30 is centrally mounted in the sample dispensing device 130, with the video display 32, the camera 34, and the user input device 36 (which together with the video display 32 is a touchscreen in the embodiment illustrated herein) all being available and with the video display 32 being mounted at roughly the head level of customers. Located below the tablet computer 30 in the sample dispensing device 130 is the vending tray 64. Also shown in the sample dispensing device 130 at a location below the vending tray 64 is a trash receptacle 134 into which the wrappers from product samples may be placed.

Located on the top of the sample dispensing device 130 is large signage 132, which may be used to attract customers to the sample dispensing device 130. The sample dispensing device 130 also has a top shelf 136 located above the tablet computer 30, and a number of side shelves 138 located on the right and left sides of the central portion of the sample dispensing device 130 in which the tablet computer 30, the vending tray 64, and the trash receptacle 134 are located. Also shown are a number of advertised products 140 which may be placed on the top shelf 136 and the side shelves 138.

Figure 4:
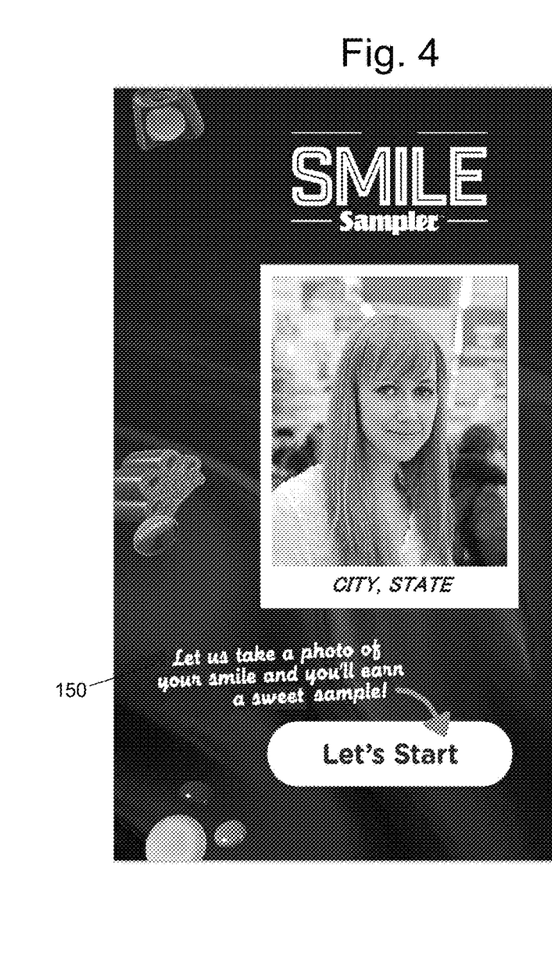
FIG. 4 is a first screenshot depicting a screen at the beginning of the process used to dispense the product sample.

Turning next to FIGS. 4 through 12, a number of screenshots are provided which depict screens (which will be displayed on the tablet computer 30 shown in FIGS. 1 and 3) to illustrate the exemplary process used by the apparatus and method for dispensing a product sample in response to the detection of a selected facial expression of the present invention to dispense the product sample. Referring first to FIG. 4, a screenshot from the beginning of the process is provided that includes an explain sample dispensing process graphic 150 thereon. The image of the person shown in the center of the screenshot is obtained from the camera 34 (shown on the tablet computer 30 in FIGS. 1 and 3).

Figure 5:
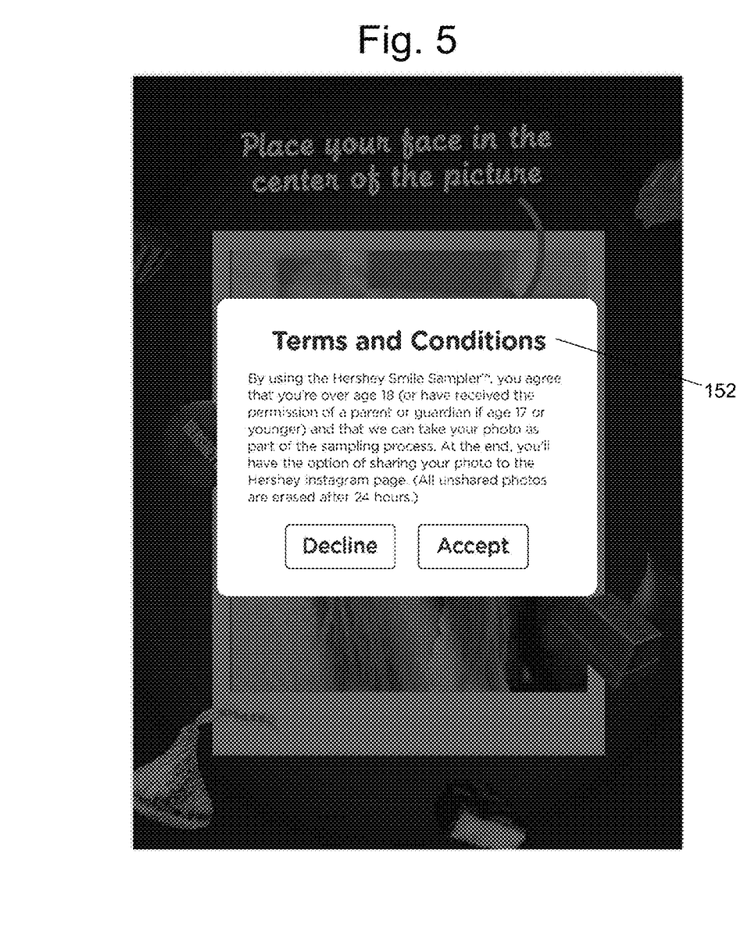
FIG. 5 is a second screenshot depicting a screen showing terms and conditions of the process used to dispense the product sample.

When a customer actuates the touchscreen (the user input device 36 shown in FIG. 1), by touching the "Let's Start" button, the screenshot shown in FIG. 5 is displayed. In this screenshot, a terms and conditions graphic 152 is provided, and the customer is asked to accept or decline. If the customer declines the terms and conditions, the screenshot shown in FIG. 4 will return. If, on the other hand, the customer accepts the terms and conditions, the screenshot shown in FIG. 6 will be displayed.

Figure 6:
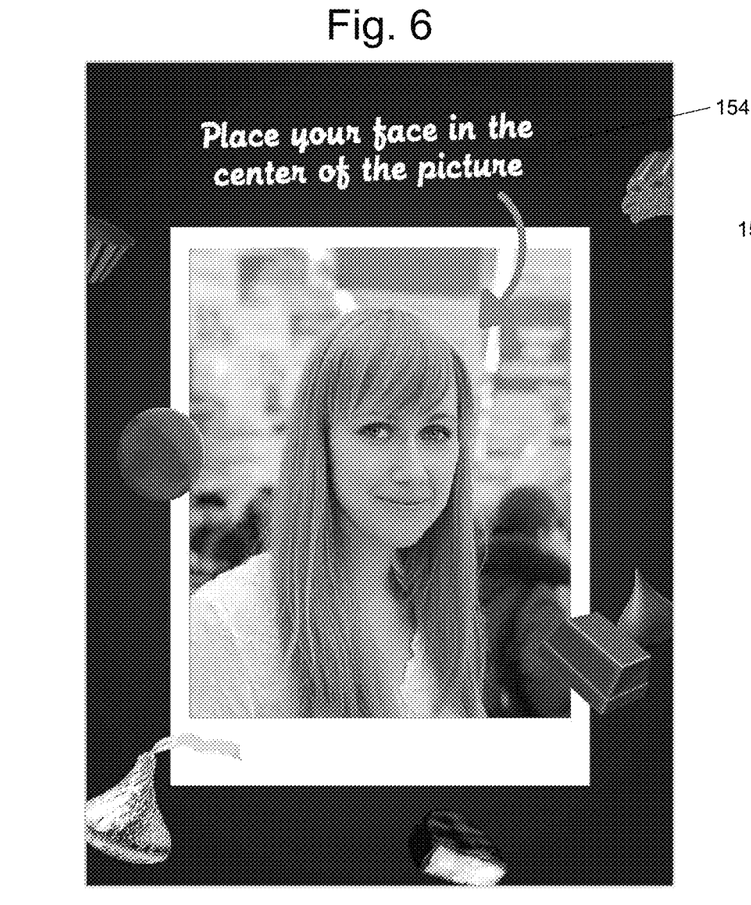
FIG. 6 is a third screenshot depicting a screen providing initial instructions for the process used to dispense the product sample.

The screenshot shown in FIG. 6 includes a center face instructions graphic 154 which instructs the customer to put his or her face in the center of the picture taken by the camera 34 (shown in FIGS. 1 and 3). Until the customer complies, the screenshot shown in FIG. 6 will be displayed. When the customer complies, the screenshot shown in FIG. 7 will be displayed.

Figure 7:
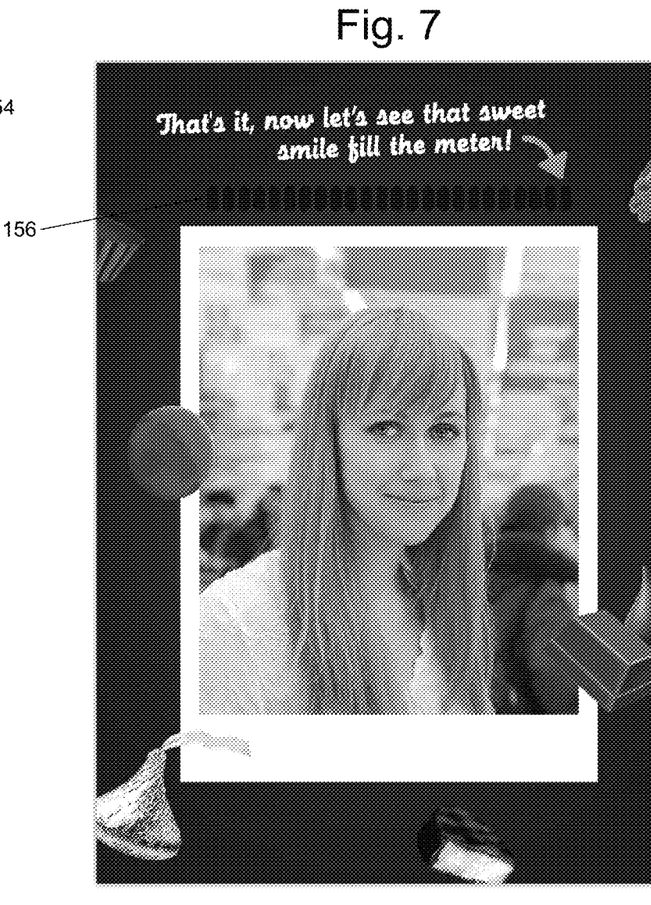
FIG. 7 is a fourth screenshot depicting a screen providing additional instructions for the process used to dispense the product sample.

In the screenshot shown in FIG. 7, the customer is instructed to smile. The screenshot shown in FIG. 7 includes a smile meter graphic 156 which is a bar graph moving from left to right which indicates how big a smile the customer is making. As the customer smiles, the bar graph will move from left to right, as shown in the screenshot shown in FIG. 8. The customer is then encouraged in the screenshot shown in FIG. 8 to smile wider.

When the customer had a very broad smile, or when the predetermined time period (timed by the no-fail timer activation step 90 shown in FIG. 2) times out as indicated by a no-fail timeout photo taken graphic 160 (depicting no or an inadequate smile), a photo of the customer will be taken. If the facial characteristic data of the photo is successfully compared to the facial characteristic data of customers' photos taken in the prior preselected time period indicating that the customer has not received a product sample within the predetermined time period, the screenshot shown in FIG. 9 will be displayed. In the screenshot shown in FIG. 9, a smile acceptance graphic 162 indicates that the picture has been taken, and that a product sample will be dispensed.

Figure 9:
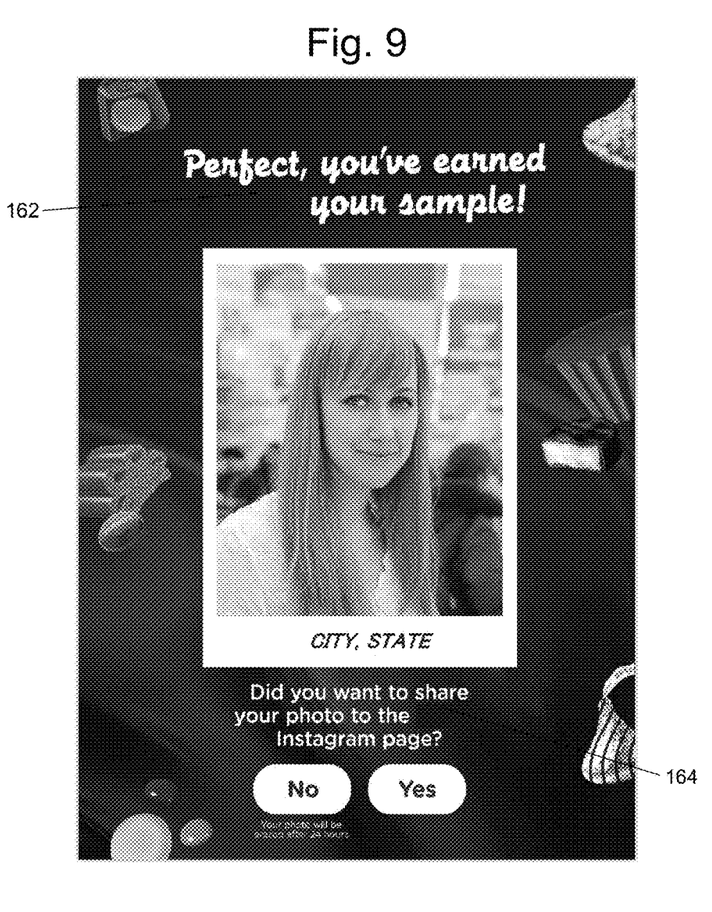
FIG. 9 is a sixth screenshot depicting a screen offering the option of sharing the photo.

Also shown in FIG. 9 is a social media sharing graphic 164 in which the customer is asked to indicate whether or not he or she is willing to have their photo shared, in this case to an Instagram page. If the customer indicates that they do not want their photo shared by pressing the "No" button, the screenshot shown in FIG. 10 will be displayed. If, on the other hand, the customer indicates that they are willing to have their photo shared by pressing the "Yes" button, the screenshot shown in FIG. 11 will be displayed.

Figure 10:
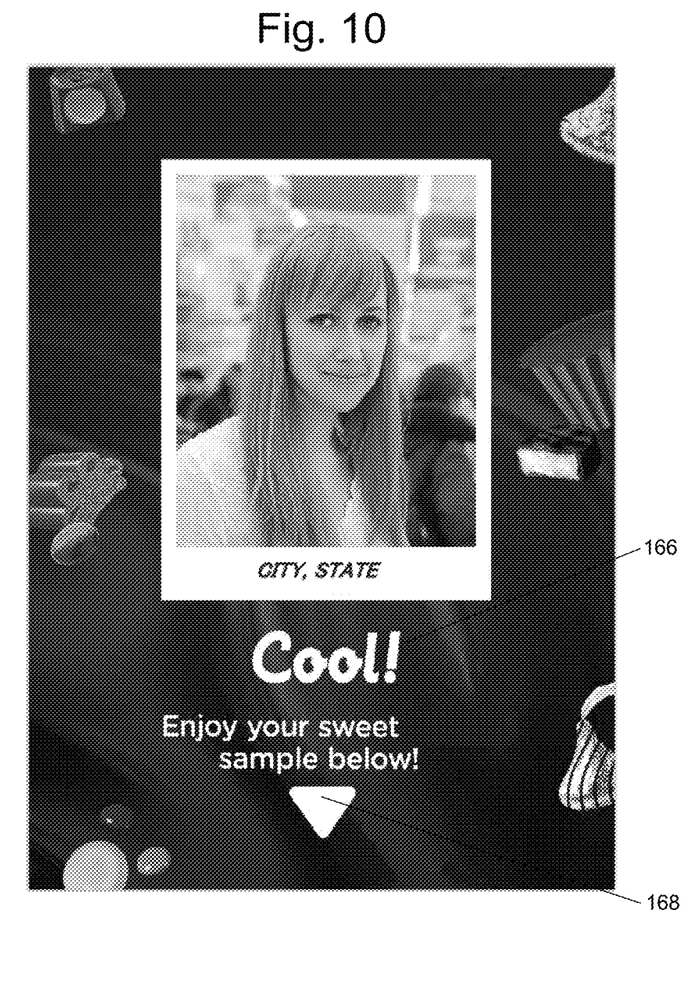
FIG. 10 is a seventh screenshot depicting a screen indicating that the photo has been shared and that a product sample has been dispensed.
Figure 11:
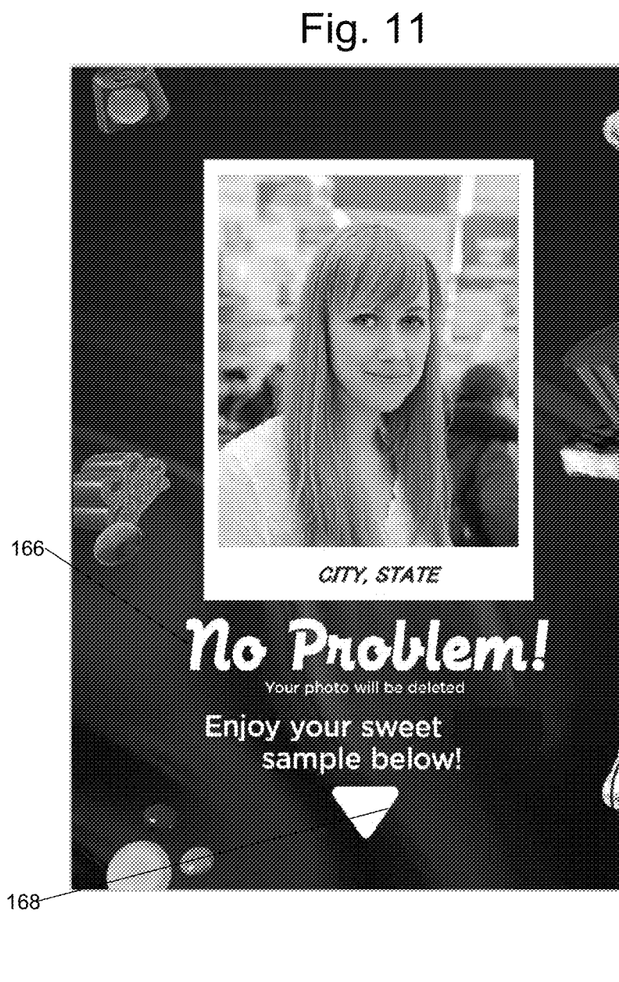
FIG. 11 is an eighth screenshot depicting a screen indicating that the photo will not be shared and that a product sample has been dispensed.

The screenshots shown in FIGS. 10 and 11 each have an end messaging graphic 166 responsive to the customer's decision as to whether or not to have their photo shared. Also, the screenshots in FIGS. 10 and 11 both have an arrow indicating that a sample has been dispensed graphic 168.

Figure 8:
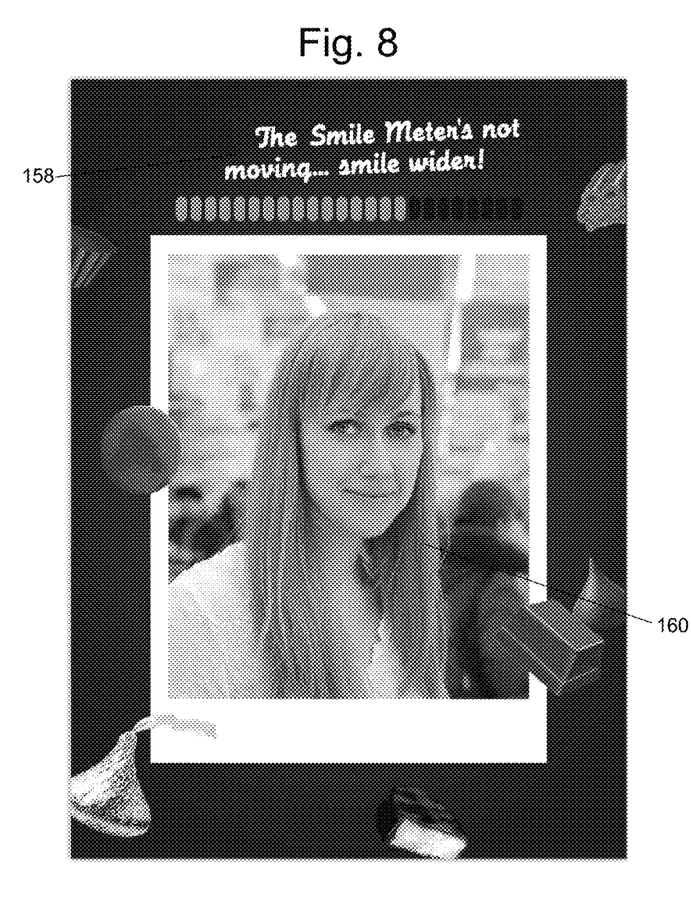
FIG. 8 is a fifth screenshot depicting a screen providing supplemental instructions for the process used to dispense the product sample.
Figure 12:
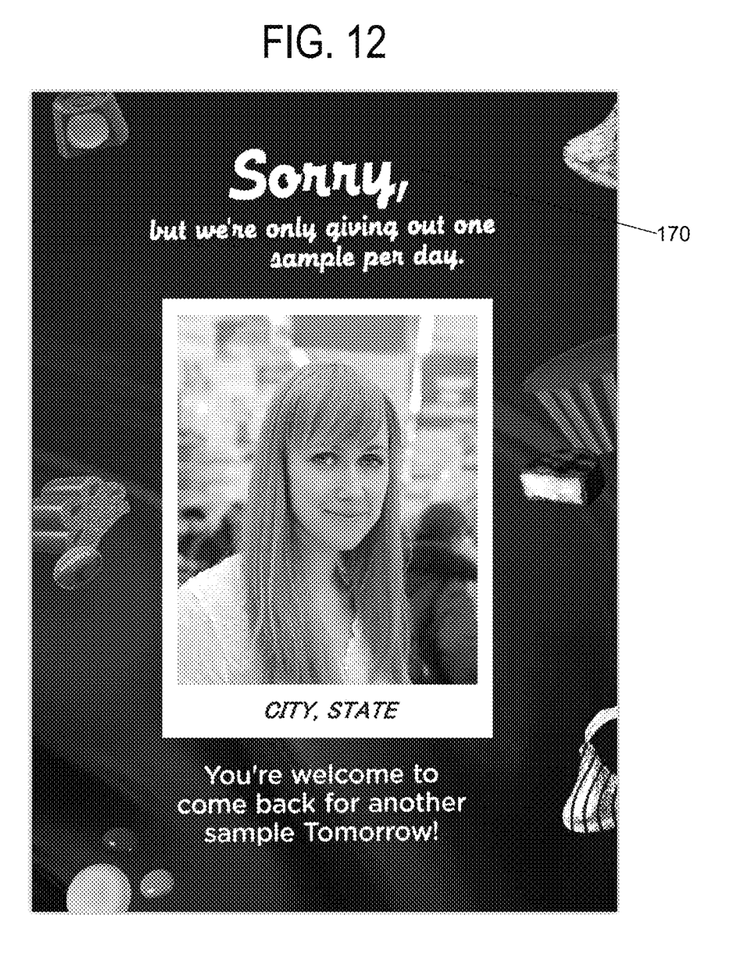
FIG. 12 is a ninth screenshot depicting a screen indicating that the customer has previously obtained a product sample within a preset time window and that accordingly another product sample will not be dispensed to this customer.

Finally, returning to the screenshot shown in FIG. 8, if the facial characteristic data of the photo is compared to the facial characteristic data of customers' photos taken in the prior preselected time period and indicates that the customer has received a product sample within the predetermined time period, the screenshot shown in FIG. 12 will be displayed. In the screenshot shown in FIG. 12, a condolence graphic 170 indicates that only one product sample may be dispensed to each customer in the predetermined time period (here twenty-four hours or one day), and that no product sample will be dispensed. The customer is informed that they may come back after the expiration of the predetermined time period to receive another product sample.

It may therefore be appreciated from the above detailed description of the preferred embodiment of the present invention that it provides an apparatus and a method to dispense a product sample in response to the detection of a selected facial expression in a new way that creates an "event-like' phenomenon drawing shoppers into store aisles and increasing purchases of the sampled product significantly, at relatively modest cost. The apparatus and method for dispensing a product sample in response to the detection of a selected facial expression of the present invention uses facial recognition software to limit sample dispensing to once every predetermined period (e.g., twenty-four hours) per customer in a manner masked by a playful interaction in an enjoyable way. Finally, the apparatus and method for dispensing a product sample in response to the detection of a selected facial expression achieves numerous advantages without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. An apparatus for dispensing a product or sample in response to the detection of a selected facial expression, comprising:
   a camera for capturing an image of a customer's face located in front of the camera;
   a display unit for displaying the image of the customer's face captured by the camera, the display unit also displaying information to prompt the customer in the use of the apparatus;
   a user input device for allowing the customer to manually respond to information prompting the customer;
   a facial characteristic analysis element for analyzing images of customers' faces;
   a facial memory storage element for storing facial characteristics of customers who have had their image captured over a prior predetermined period of time;
   a facial analysis element for detecting a selected facial expression in the image of the customer's face captured by the camera;
   an identification element for determining whether the customer's facial characteristics are the same as the facial characteristics of one of the customers who have had their image captured over the prior predetermined period of time;
   a dispensing unit to dispense a product or sample upon receipt of a product dispending signal; and
   a processing unit for generating a product dispending signal only if: 1. the identification element determines that the customer's facial characteristics are different from the facial characteristics of all of the customers who have had their image captured over the prior predetermined period of time; and 2. if the facial analysis unit detects the selected facial expression in the image of the customer's face captured by the camera.

2. An apparatus as defined in claim 1, wherein the selected facial expression comprises a smile.

3. An apparatus as defined in claim 1, wherein the camera comprises a digital camera.

4. An apparatus as defined in claim 1, wherein the display unit and the user input device together comprise a touchscreen.

5. An apparatus as defined in claim 1, wherein the camera, the display unit, and the user input device together comprise a tablet computer.

6. An apparatus as defined in claim 1, wherein the facial characteristics of each customer who receives a product or sample is stored in the facial memory storage element for the prior predetermined period of time after such customer receives a product or sample.

7. An apparatus as defined in claim 1, wherein the processing unit is configured to generate the product dispending signal after an extended period of time even if the facial analysis unit has not detected the selected facial expression in the image of the customer's face captured by the camera.

8. An apparatus as defined in claim 1, wherein the processing unit is configured to display a one sample product limitation on the display unit if the identification element determines that the customer's facial characteristics are identical to the facial characteristics of a customer who has had their image captured over the prior predetermined period of time.

9. An apparatus as defined in claim 1, wherein a product dispending signal is generated even if the facial analysis unit detects the selected facial expression in the image of the customer's face captured by the camera after the passage of a second preselected period of time.

10. A method for dispensing a product or sample in response to the detection of a selected facial expression, comprising:
    capturing an image of a customer's face located in front of a camera;
    displaying the image of the customer's face captured by the camera on a display unit, the display unit also displaying information to prompt the customer in the use of the apparatus;
    allowing the customer to manually respond on a user input device to information prompting the customer;
    analyzing images of customers' faces with a facial characteristic analysis element;
    storing facial characteristics of customers who have had their image captured over a prior predetermined period of time in a facial memory storage element;
    detecting a selected facial expression in the image of the customer's face captured by the camera with a facial analysis element;
    determining whether the customer's facial characteristics are the same as the facial characteristics of one of the customers who have had their image captured over the prior predetermined period of time with an identification element;
    generating a product dispending signal only if: 1. the identification element determines that the customer's facial characteristics are different from the facial characteristics of all of the customers who have had their image captured over the prior predetermined period of time; and 2. if the facial analysis unit detects the selected facial expression in the image of the customer's face captured by the camera; and
    dispensing a product or sample from a dispensing unit upon receipt of a product dispending signal.

11. A method as defined in claim 10, wherein the selected facial expression comprises a smile.

12. A method as defined in claim 10, wherein the camera comprises a digital camera.

13. A method as defined in claim 10, wherein the display unit and the user input device together comprise a touchscreen.

14. A method as defined in claim 10, wherein the camera, the display unit, and the user input device together comprise a tablet computer.

15. A method as defined in claim 10, wherein the facial characteristics of each customer who receives a product or sample is stored in the facial memory storage element for the prior predetermined period of time after such customer receives a product or sample.

16. A method as defined in claim 10, wherein the processing unit generates the product dispending signal after an extended period of time even if the facial analysis unit has not detected the selected facial expression in the image of the customer's face captured by the camera.

17. A method as defined in claim 10, wherein the processing unit displays a one sample product limitation on the display unit if the identification element determines that the customer's facial characteristics are identical to the facial characteristics of a customer who has had their image captured over the prior predetermined period of time.

18. A method as defined in claim 10, wherein a product dispending signal is generated even if the facial analysis unit detects the selected facial expression in the image of the customer's face captured by the camera after the passage of a second preselected period of time.

19. An apparatus for dispensing a product in response to the detection of a selected facial expression, comprising:
   a camera for capturing an image of a customer's face;
   a display unit for displaying the image of the customer's face captured by the camera;
   a facial memory storage element for storing parameters of a desired facial characteristic;
   a facial memory storage element for storing facial characteristics of customers who have previously had their image captured over a prior predetermined period time;
   a facial analysis element for determining whether an image of a customer's face contains the desired facial characteristic;
   an identification element for determining whether the customer's facial characteristics are the same as the facial characteristics of one of the customers who have had their image captured over the prior predetermined period of time;
   a dispensing unit to dispense a product upon receipt of a product dispending signal; and
   a processing unit for generating a product dispending signal only if: 1. the identification element determines that the customer's facial characteristics are different from the facial characteristics of all of the customers who have had their image captured previously; and 2. the identification element determines that the image of a customer's face contains the desired facial characteristic.

20. An apparatus as defined in claim 19, wherein the desired facial expression comprises a smile.

* * * * *